US011928829B2

United States Patent
Sakamoto et al.

(10) Patent No.: US 11,928,829 B2
(45) Date of Patent: Mar. 12, 2024

(54) INFORMATION PROCESSING DEVICE, INFORMATION PROCESSING METHOD, AND RECORDING MEDIUM RECORDED WITH INFORMATION PROCESSING PROGRAM PRELIMINARY CLASS

(71) Applicant: TOYOTA JIDOSHA KABUSHIKI KAISHA, Toyota (JP)

(72) Inventors: Hirotaka Sakamoto, Kaisei-machi (JP); Masao Yano, Shizuoka-ken (JP); Tetsuya Shoji, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 17/480,390

(22) Filed: Sep. 21, 2021

(65) Prior Publication Data

US 2022/0101543 A1 Mar. 31, 2022

(30) Foreign Application Priority Data

Sep. 25, 2020 (JP) ................................. 2020-161482

(51) Int. Cl.
*G06T 7/37* (2017.01)
*G06F 18/23* (2023.01)

(52) U.S. Cl.
CPC ............... *G06T 7/37* (2017.01); *G06F 18/23* (2023.01); *G06T 2207/10056* (2013.01)

(58) Field of Classification Search
CPC .. G06T 7/37; G06T 2207/10056; G06F 18/23
See application file for complete search history.

(56) References Cited

U.S. PATENT DOCUMENTS 5,999,255 A * 12/1999 Dupee ................... G01J 3/0208
356/301
7,653,232 B2 * 1/2010 Kothapalli ............ G06T 7/0012
382/132

(Continued)

FOREIGN PATENT DOCUMENTS

JP 6-249803 A 9/1994
JP 2012-202701 A 10/2012

OTHER PUBLICATIONS

Ikuna et al., "Structure-Directing Behaviors of Tetraethylammonium Cations toward Zeolite Beta Revealed by the Evolution of Aluminosilicate Species Formed during the Crystallization Process" (pp. 14533-14544). (Year: 2015).*

(Continued)

*Primary Examiner* — Manav Seth
(74) *Attorney, Agent, or Firm* — Sughrue Mion, PLLC

(57) ABSTRACT

An information processing device acquires an image captured by a transmission electron microscope. The information processing device, for each partial region in the image, executes a two-dimensional Fourier transform on an image of the partial region. The information processing device, based on results obtained by executing the two-dimensional Fourier transform on each of the partial regions, performs clustering of frequency strengths obtained from the results of the two-dimensional Fourier transform. The information processing device determines regions of different crystallinity in the image, based on results of the clustering.

9 Claims, 7 Drawing Sheets

(56) References Cited

U.S. PATENT DOCUMENTS

| | | | | |
|---|---|---|---|---|
| 8,628,691 B2* | 1/2014 | Murai | ............. | H10N 10/01 |
| | | | | 977/773 |
| 9,755,128 B2* | 9/2017 | Banerjee | ............. | H10N 10/01 |
| 10,217,205 B2* | 2/2019 | Park | ............. | G06V 20/69 |
| 2014/0141237 A1* | 5/2014 | Takeyasu | ............. | H01B 1/08 |
| | | | | 428/336 |
| 2015/0290621 A1* | 10/2015 | Miura | ............. | B01J 37/031 |
| | | | | 502/304 |
| 2019/0103269 A1* | 4/2019 | Freund | ............. | H01L 21/02266 |

OTHER PUBLICATIONS

Ma et al., "Spatial Fourier-Transform Analysis of the Morphology of Bulk Heterojunction Materials Used in "Plastic" Solar Cells**" (pp. 1387-1390). (Year: 2007).*

HREM Research Inc., "GPA for Digital Micrograph", https://www.hremresearch.com/Eng/download/documents/gpa4drn.pdf, Jun. 2017, pp. 1-50.

Jacob Madsen et al., "A Deep Learning Approach to Identify Local Structures in Atomic-Resolution Transmission Electron Microscopy Images", https://onlinelibrary.wiley.com/doi/abs/10.1002/adts.201800037@10.1002/(ISSN)25130390.MachineLearning, Cont-mat.mtrl-sci, Feb. 9, 2018.

* cited by examiner

INFORMATION PROCESSING DEVICE, INFORMATION PROCESSING METHOD, AND RECORDING MEDIUM RECORDED WITH INFORMATION PROCESSING PROGRAM PRELIMINARY CLASS

CROSS-REFERENCE TO RELATED APPLICATION

This application is based on and claims priority under 35 USC 119 from Japanese Patent Application No. 2020-161482 filed on Sep. 25, 2020, the disclosure of which is incorporated by reference herein.

TECHNICAL FIELD

The present disclosure relates to an information processing device, an information processing method, and a recording medium recorded with an information processing program.

RELATED ART

Technology relating to analysis of images captured using a transmission electron microscope (TEM) (such images are referred to hereafter as TEM images) is known. For example, "GPA for Digital Micrograph" (HREM Research Inc., see https://www.hremresearch.com/Eng/download/documents/gpa4dm.pdf) discloses general image analysis technology for TEM images.

Furthermore, "A Deep Learning Approach to Identify Local Structures in Atomic-Resolution Transmission Electron Microscopy Images" (Jacob Madsen et al, see https://onlinelibrary.wiley.com/doi/abs/10.1002/adts.201800037@10.1002/(ISSN)25130390. Machine Learning) discloses technology for using a deep neural network to analyze local structures of substances depicted in TEM images.

In some cases, it is desirable to evaluate the crystallinity of a material depicted in a TEM image. FIG. 8 illustrates an example of TEM images. For example, as illustrated in FIG. 8, locations exhibiting patterns such as those depicted in the TEM images IM1, IM2 include locations that are locations of high crystallinity and locations that are locations of low crystallinity.

A conceivable approach when attempting to evaluate the crystallinity of the TEM images IM1, IM2 illustrated in FIG. 8 might be, for example, to evaluate the crystallinity based on brightness values of the images as illustrated in FIG. 9.

However, there are many high crystallinity locations $L_1$ and low crystallinity locations $L_2$ that are locations having substantially the same brightness in a TEM image IM such as that illustrated in FIG. 9, and so crystallinity is not able to be evaluated simply by image brightness values. An image such as the image IMb in FIG. 9 is generated in cases in which thresholding is performed simply on brightness values of the TEM image IM. In the image IMb in FIG. 9, although portions having high brightness values are simply extracted at a pixel unit level, portions of different crystallinity are not extractable at a region unit level.

Accordingly, for example, image analysis such as disclosed in "GPA for Digital Micrograph" (HREM Research Inc.) is unable on its own to determine regions of different crystallinity in the material depicted in the TEM image.

Furthermore, an attempt to evaluate the crystallinity of the material depicted in a TEM image by employing a neural network or the like, such as that disclosed in "A Deep Learning Approach to Identify Local Structures in Atomic-Resolution Transmission Electron Microscopy Images" (Jacob Madsen et al), would need a large volume of labeled training data to be prepared. The precision of a trained model such as a neural network or the like is dependent on the quality and quantity of such training data. Any attempt to generate a trained model offering high precision relies on the preparation of a large volume of training data, and the preparation thereof takes considerable effort.

As discussed above, the related art in "GPA for Digital Micrograph" (HREM Research Inc., see https://www.hremresearch.com/Eng/download/documents/gpa4dm.pdf) and "A Deep Learning Approach to Identify Local Structures in Atomic-Resolution Transmission Electron Microscopy Images" (Jacob Madsen et al) is unable to easily determine the crystallinity of a material depicted in a TEM image.

In consideration of the above circumstances, the present disclosure provides simple determination of the crystallinity of a material depicted in a TEM image.

SUMMARY

An information processing device of a first aspect is an information processing device including: an acquisition section configured to acquire an image captured by a transmission electron microscope; a conversion section configured to execute a two-dimensional Fourier transform on an image of a partial region for each partial region in the image acquired by the acquisition section; a clustering section configured to perform clustering of frequency strengths obtained from results of the two-dimensional Fourier transform based on results obtained by the conversion section executing the two-dimensional Fourier transform on each of the partial regions; and a determination section configured to determine regions of different crystallinity in the image based on results of the clustering by the clustering section.

In an information processing device of a second aspect, the clustering section is configured to cluster plural of the partial regions into a first cluster representing regions of high crystallinity and a second cluster representing regions of low crystallinity. This enables determination as to whether each of the partial regions is a region of high crystallinity or a region of low crystallinity.

In an information processing device of a third aspect, the conversion section is configured to execute the two-dimensional Fourier transform on each of the partial regions, each of the partial regions representing an image within a predetermined range centered on a center pixel. The determination section is configured to determine whether or not each of the partial regions is a region of high crystallinity by determining whether or not the center pixel of each of the partial regions is a high crystallinity pixel from results of the clustering by the clustering section based on results of the two-dimensional Fourier transform calculated for each of the partial regions. This enables determination as to whether each of the pixels in the image is in a region of high crystallinity or a region of low crystallinity.

An information processing device of a fourth aspect further includes an image generation section configured to generate a crystallinity image expressing degrees of crystallinity by, based on results of determination for each of the center pixels by the determination section, applying a first pixel value to pixels at positions corresponding to the center pixel in cases in which high crystallinity has been determined and applying a second pixel value to pixels at positions corresponding to the center pixel in cases in which low crystallinity has been determined. This enables regions of different crystallinity in the material depicted in the TEM image to be made visible.

In an information processing device of a fifth aspect, the clustering section is further configured to integrate frequency strengths obtained from the results of the two-dimensional Fourier transform and to cluster values obtained by the integration. This enables regions of different crystallinity to be determined by taking the frequency strengths in the partial regions into consideration.

In an information processing device of a sixth aspect, the clustering section is further configured to employ a predetermined vector compression method to compress higher dimensional vectors that are values obtained by the integration into lower dimensional vectors that are vectors with fewer dimensions than the higher dimensional vectors, and to cluster the compressed lower dimensional vectors. This reduces the amount of information, enabling the amount of processing required to determine the crystallinity to be reduced.

An information processing method of a seventh aspect is an information processing method in which a computer executes processing, the processing including: acquiring an image captured by a transmission electron microscope; for each partial region in the acquired image, executing a two-dimensional Fourier transform on an image of the partial region; based on results obtained by executing the two-dimensional Fourier transform on each of the partial regions, performing clustering of frequency strengths obtained from the results of the two-dimensional Fourier transform; and determining regions of different crystallinity in the image based on results of the clustering.

An information processing program of an eighth aspect is an information processing program for causing a computer to execute processing, the processing including: acquiring an image captured by a transmission electron microscope; for each partial region in the acquired image, executing a two-dimensional Fourier transform on an image of the partial region; based on results obtained by executing the two-dimensional Fourier transform on each of the partial regions, performing clustering of frequency strengths obtained from the results of the two-dimensional Fourier transform; and determining regions of different crystallinity in the image based on results of the clustering.

As described above, the present disclosure exhibits an advantageous effect of enabling simple determination of the crystallinity of a material depicted in a TEM image.

DESCRIPTION OF EMBODIMENTS

Exemplary Embodiment

Figure 1:
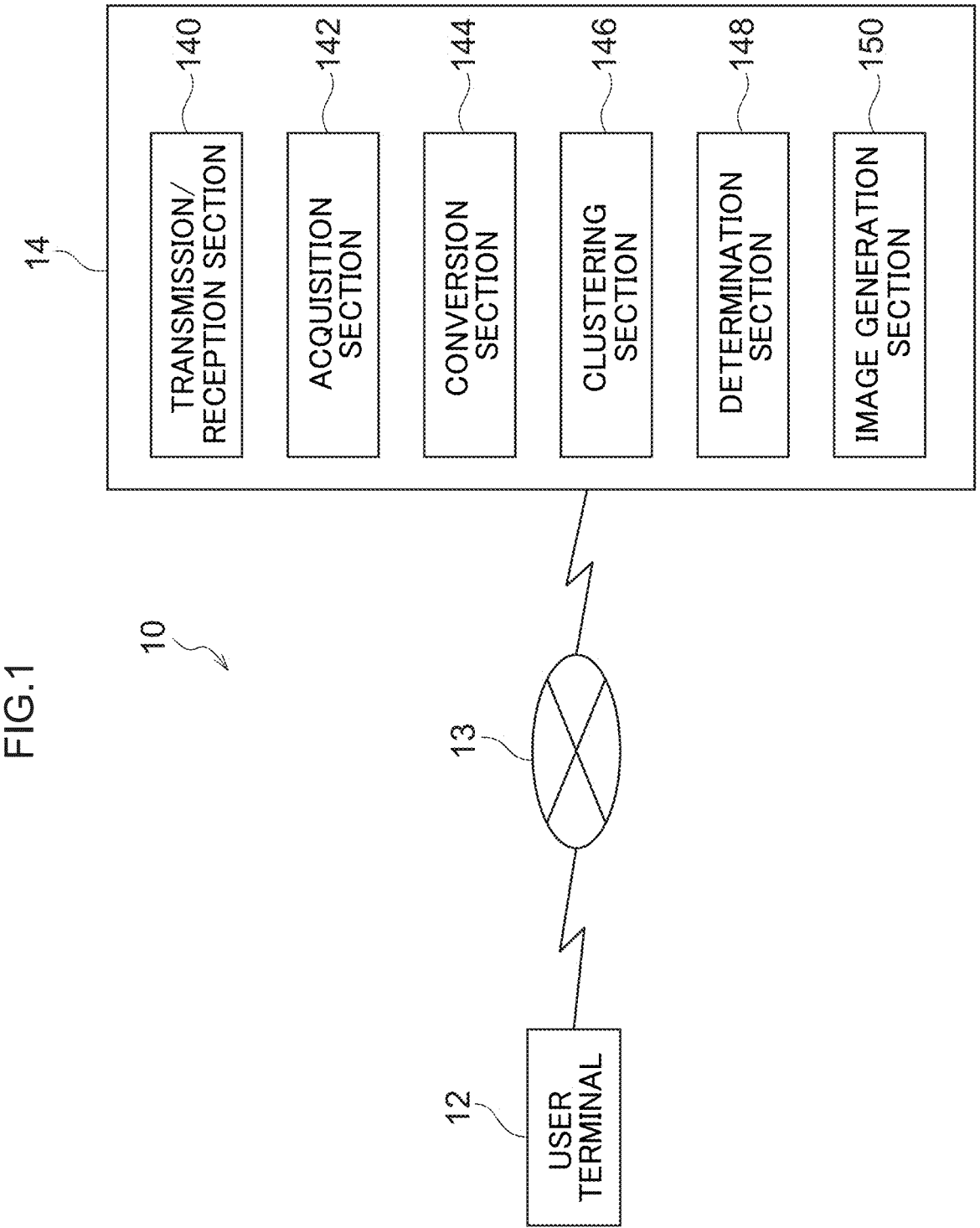
FIG. 1 is a schematic block diagram illustrating an information processing system according to an exemplary embodiment.

FIG. 1 is a block diagram illustrating an example of a functional configuration of an information processing system 10 according to an exemplary embodiment. As illustrated in FIG. 1, the information processing system 10 includes a user terminal 12 and a server 14 serving as an example of an information processing device. The user terminal 12 and the server 14 are, for example, connected together over a network 13 such as the internet.

The information processing system 10 according to the present exemplary embodiment is configured to analyze a TEM image, namely an image captured by a transmission electron microscope, and to determine the crystallinity of a material depicted in the TEM image. Specifically, the server 14 of the information processing system 10 executes a Fourier transform on each partial region in a TEM image transmitted from the user terminal 12 in order to obtain frequency strengths for each of the partial regions. The server 14 performs clustering according to the frequency strengths of each of the partial regions in the TEM image in order to determine regions of different crystallinity in the TEM image. This enables simple determination of the crystallinity of a material depicted in the TEM image.

Specific explanation follows regarding the above.

User Terminal

A user inputs a TEM image of an analysis subject material into the user-operated user terminal 12. The TEM image is an image of the material captured using a transmission electron microscope.

The user terminal 12 transmits the TEM image input by the user to the server 14 over the network 13. The TEM image transmitted from the user terminal 12 is analyzed by the server 14, described later.

Server

As illustrated in FIG. 1, the server 14 includes a transmission/reception section 140, an acquisition section 142, a conversion section 144, a clustering section 146, a determination section 148, and an image generation section 150.

The transmission/reception section 140 receives the TEM image transmitted from the user terminal 12.

The acquisition section 142 acquires the TEM image received by the transmission/reception section 140.

Figure 2:
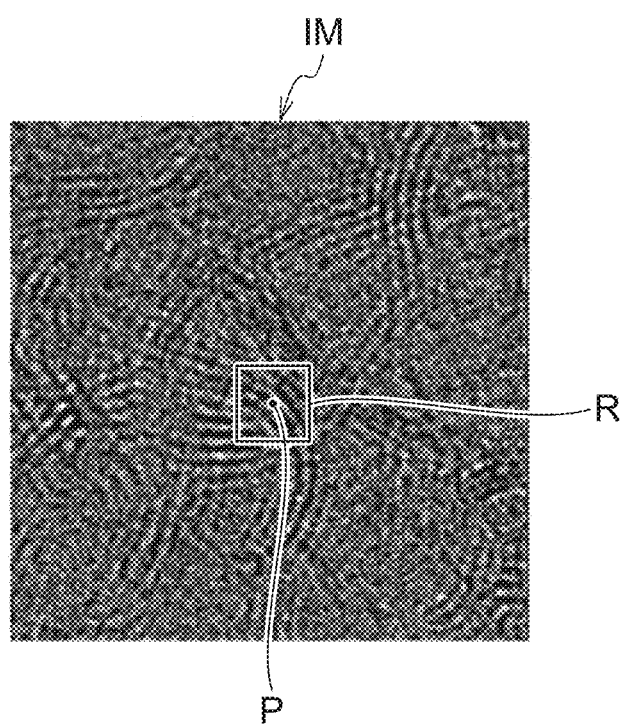
FIG. 2 is a diagram to explain a partial region in a TEM image.

For each of the partial regions in the TEM image acquired by the acquisition section 142, the conversion section 144 executes a two-dimensional Fourier transform on an image of the partial region. FIG. 2 is a diagram to explain the partial regions in a TEM image.

Specifically, as illustrated in FIG. 2, the conversion section 144 sets plural partial regions R in a TEM image IM, with each partial region R representing an image within a predetermined range centered on a center pixel P. For example, the conversion section 144 sequentially sets each of the partial regions R by setting each pixel configuring the TEM image IM as the center pixel P. The conversion section 144 then executes the two-dimensional Fourier transform on each of the partial regions.

Based on results obtained by the conversion section 144 executing the two-dimensional Fourier transform on each of the partial regions, the clustering section 146 applies known technology to perform clustering of frequency strengths obtained from the results of the two-dimensional Fourier transform into two or more clusters. Note that the frequency strengths configure a power spectrum.

Figure 3:
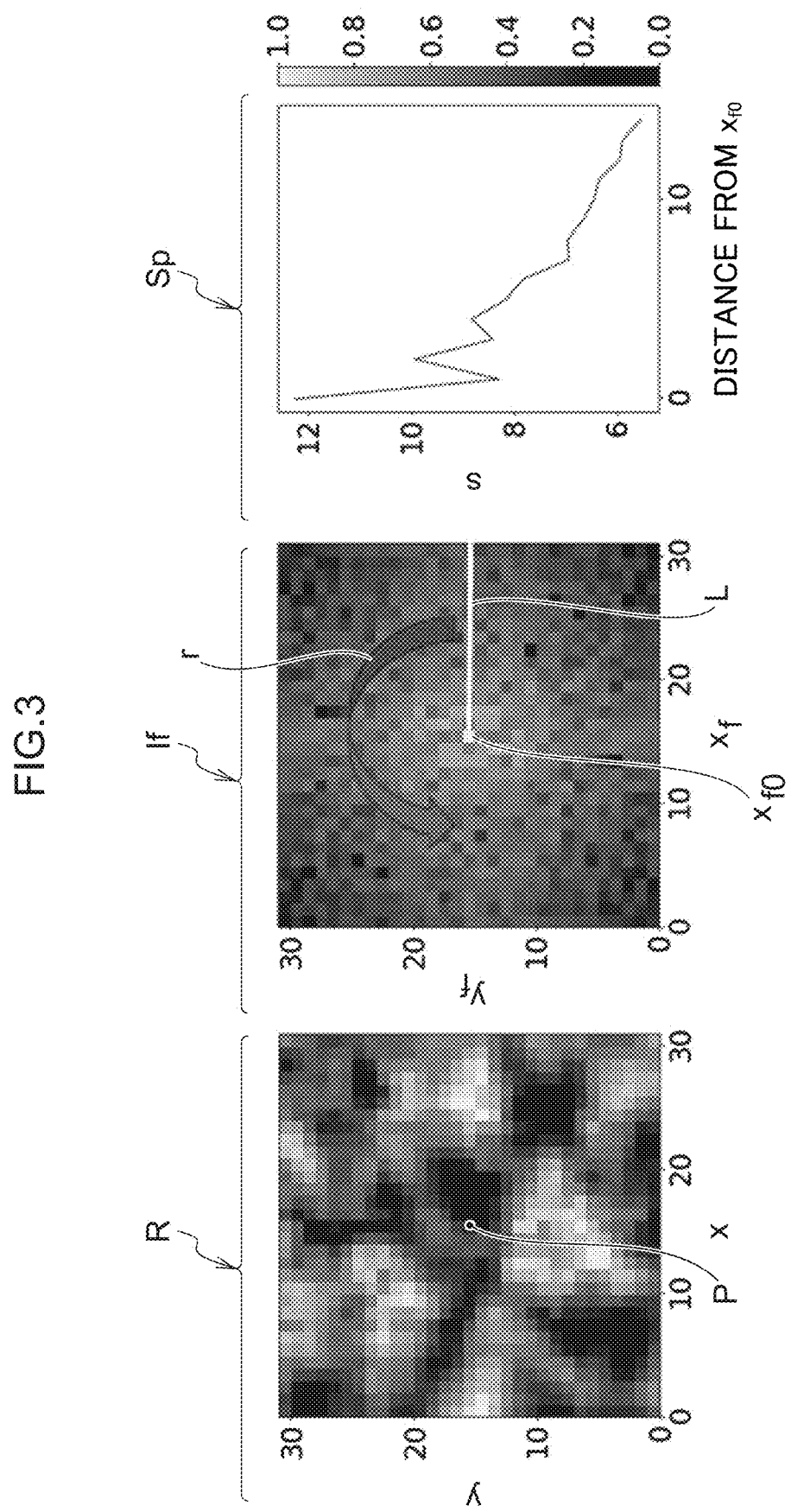
FIG. 3 is a diagram to explain a method for obtaining frequency strength from results of a two-dimensional Fourier transform.

FIG. 3 illustrates a diagram to explain a method for obtaining the frequency strengths from the results of the two-dimensional Fourier transform. Suppose that a two-dimensional Fourier transform result If has been obtained for a single partial region R, as illustrated in FIG. 3. Each pixel value of the two-dimensional Fourier transform result If corresponds to a frequency strength. In this case, as illustrated in FIG. 3, the clustering section 146 sets a straight line L from a center $x_{f0}$ of the two-dimensional Fourier transform result If toward the outside, and acquires each of the frequency strengths at positions on the straight line L. The clustering section 146 then generates a vector with the frequency strength at each position on the straight line L as components.

Next, the clustering section 146 rotates the straight line L illustrated in FIG. 3 by a small amount in the direction of arrow r. The clustering section 146 then acquires a vector with the frequency strength at each position on this new straight line L as components. In this manner, the clustering section 146 acquires vectors representing frequency strengths in respective directions of the two-dimensional Fourier transform result If, and integrates these vectors to obtain a higher dimensional vector representing integrated values as illustrated in the graph Sp in FIG. 3. Note that the horizontal axis of the graph Sp represents a distance from the center $x_{f0}$ of the two-dimensional Fourier transform result If, and the vertical axis of the graph Sp represents the frequency strength S. The respective values in the graph Sp correspond to values of the respective components of the higher dimensional vector. A single higher dimensional vector is accordingly obtained for each single partial region.

Next, the clustering section 146 employs principal component analysis, this being an example of a predetermined vector compression method, to compress the higher dimensional vector into a lower dimensional vector. The lower dimensional vector is a vector with fewer dimensions than the higher dimensional vector. Accordingly, each single partial region corresponds to a single lower dimensional vector.

Figure 4:
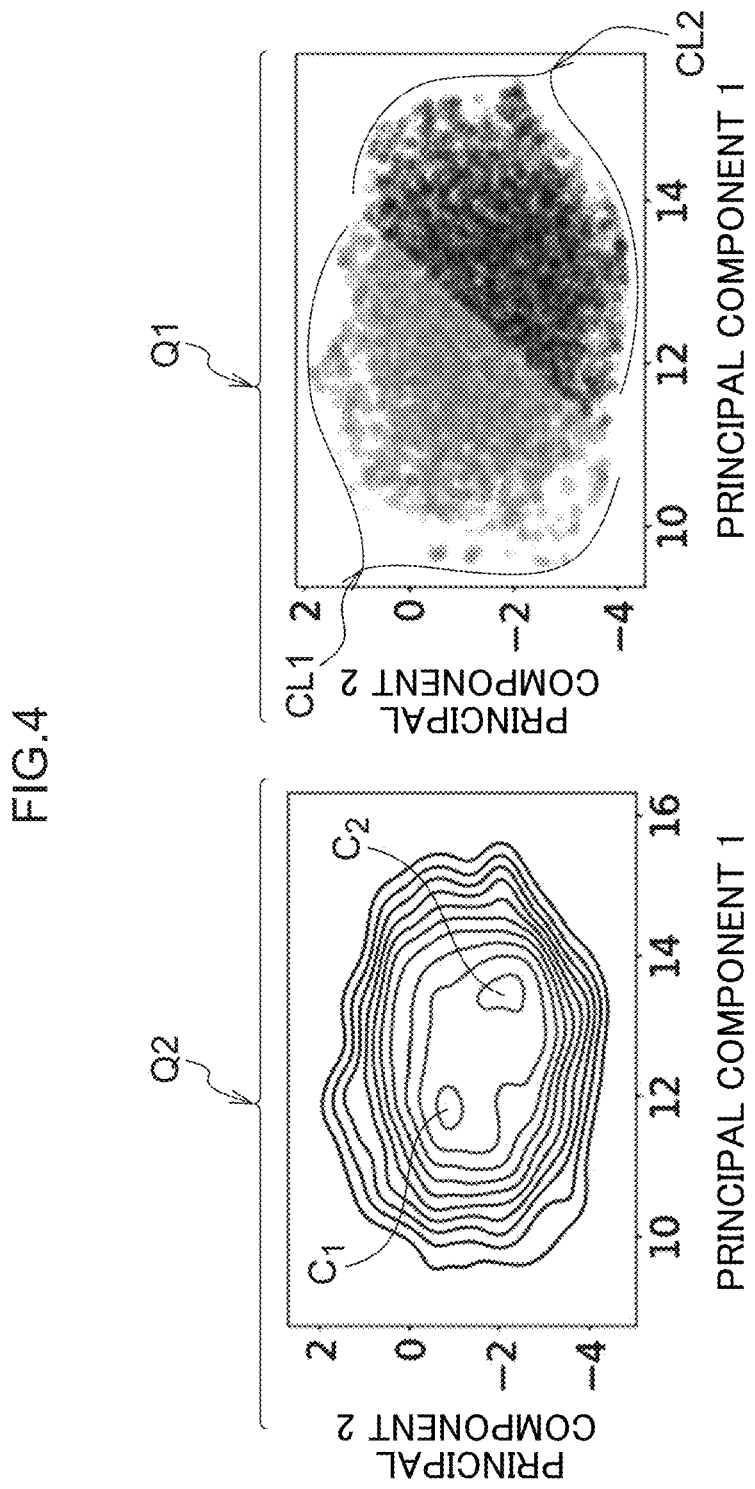
FIG. 4 is a diagram to explain clustering.

FIG. 4 is a diagram to explain clustering. In cases in which the lower dimensional vector is a two-dimensional vector, a single two-dimensional vector corresponds to a single partial region, and a distribution such as that labeled Q1 in FIG. 4 is formed thereby.

For example, in cases in which the lower dimensional vectors obtained by compression are clustered into two clusters, the clustering section 146 cluster the lower dimensional vectors into a first cluster representing regions of high crystallinity, and a second cluster representing regions of low crystallinity.

For example, in cases in which a two-dimensional vector distribution such as that labeled Q1 in FIG. 4 is clustered into two clusters, a first cluster CL1 and a second cluster CL2 are obtained as clustering results according to the two-dimensional vector distribution.

The diagram labeled Q2 in FIG. 4 represents the density of the two-dimensional vector distribution, and the densities are indicated by contour lines. For example, C1 therein indicates the center of a first cluster corresponding to partial regions with a high degree of crystallinity, and C2 therein indicates the center of a second cluster corresponding to partial regions with a low degree of crystallinity.

The determination section 148 determines regions of different crystallinity in the TEM image based on results of the clustering by the clustering section 146. Specifically, the determination section 148 determines whether or not the center pixel of each of the partial regions is a pixel where there is high crystallinity based on the clustering results. Determination is accordingly made as to whether or not each of the plural partial regions is a region of high crystallinity.

For example, the determination section 148 determines the center pixel of the partial region belonging to the first cluster to be a high crystallinity pixel. On the other hand, the determination section 148 determines the center pixel of the partial region belonging to the second cluster to be a low crystallinity pixel.

In cases in which the center pixel has been determined to be high crystallinity based on the determination results for each of the center pixels by the determination section 148, the image generation section 150 applies a first pixel value (for example a pixel value expressing white) to the pixel at the position corresponding to the center pixel. In cases in which the center pixel has been determined to be low crystallinity based on the determination results for each of the center pixels by the determination section 148, the image generation section 150 applies a second pixel value (for example a pixel value expressing black) to the pixel at the position corresponding to the center pixel. In this manner, the image generation section 150 generates a crystallinity image expressing the degree of crystallinity.

Figure 5:
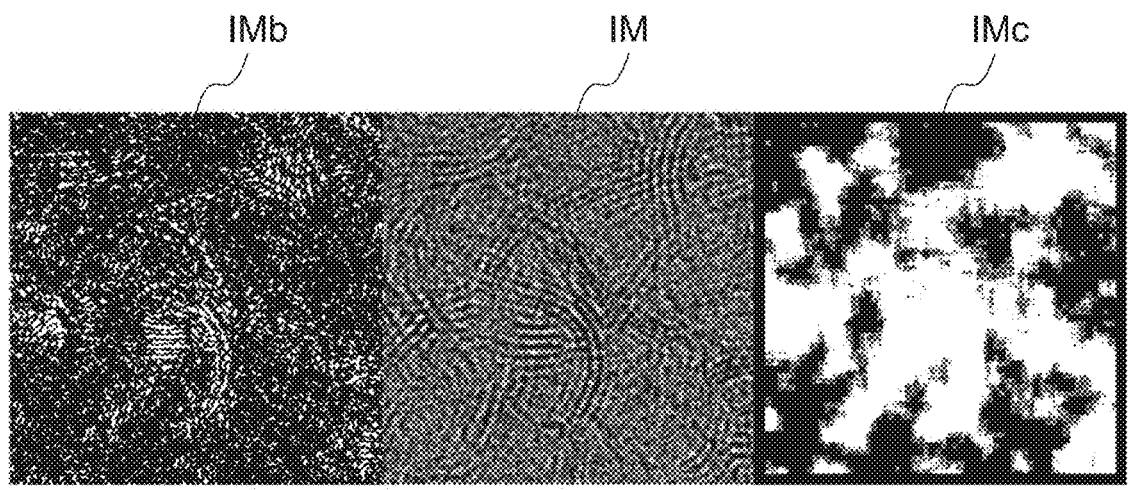
FIG. 5 is a diagram illustrating an example of crystallinity images.

FIG. 5 illustrates an example of the TEM image IM, a crystallinity image IMb generated using related technology, and a crystallinity image IMc generated by the processing of the server 14 of the present exemplary embodiment. The crystallinity image IMb generated using related technology is an image obtained by thresholding brightness values of an image to evaluate crystallinity.

In the crystallinity image IMc generated by the processing of the server 14 of the present exemplary embodiment, white is applied in cases in which the center pixel is determined to belong in the first cluster and to have high crystallinity, and black is applied in cases in which the center pixel is determined to belong in the second cluster and to have low crystallinity. As illustrated in FIG. 5, the crystallinity image IMb obtained using a related method is an image obtained by thresholding based simply on pixel values, and although locations of high crystallinity are extractable at a pixel unit level, locations are not extractable at a region unit level. By contrast, it can be seen that in the crystallinity image IMc locations of high crystallinity are extractable with good precision at the region unit level.

The transmission/reception section 140 transmits the crystallinity image generated by the image generation section 150 to the user terminal 12.

The user terminal 12 receives the crystallinity image transmitted from the server 14. The user then checks the crystallinity image displayed on a display section of the user terminal 12.

Figure 6:
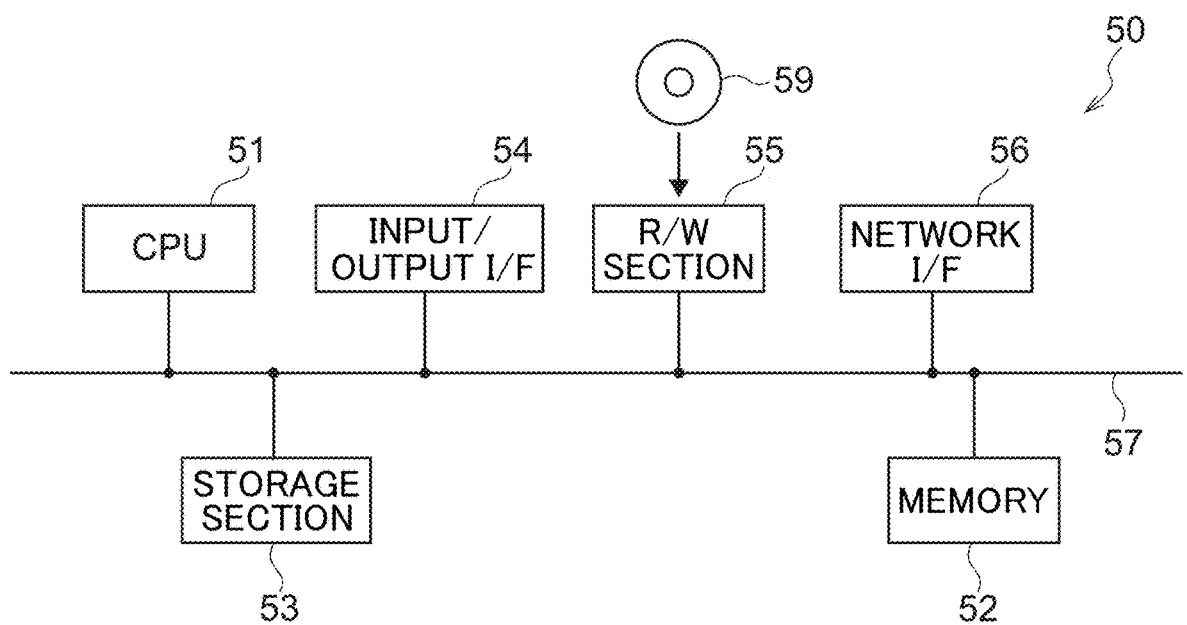
FIG. 6 is a diagram illustrating an example of a configuration of a computer of a user terminal and of a server according to an exemplary embodiment.

The user terminal 12 and the server 14 may be implemented by a computer 50 such as that illustrated in FIG. 6. The computer 50 implementing the user terminal 12 and the server 14 includes a CPU 51, memory 52 serving as a temporarily storage region, and a non-volatile storage section 53. The computer further includes an input/output interface (I/F) 54 to which an input/output device or the like (not illustrated in the drawings) is connected, and a read/write (R/W) section 55 that controls reading and writing of data with respect to a recording medium 59. The computer further includes a network I/F 56 connected to a network such as the internet. The CPU 51, the memory 52, the storage section 53, the input/output I/F 54, the R/W section 55, and the network I/F 56 are connected together through a bus 57.

The storage section 53 may be implemented by a hard disk drive (HDD), a solid state drive (SSD), flash memory, or the like. The storage section 53 that serves as a storage medium is stored with a program to cause a computer to function. The CPU 51 reads the program from the storage section 53 and expands the program in the memory 52, and processes of the program are executed in sequence.

Next, explanation follows regarding operation of the information processing system 10 of the present exemplary embodiment.

Figure 7:
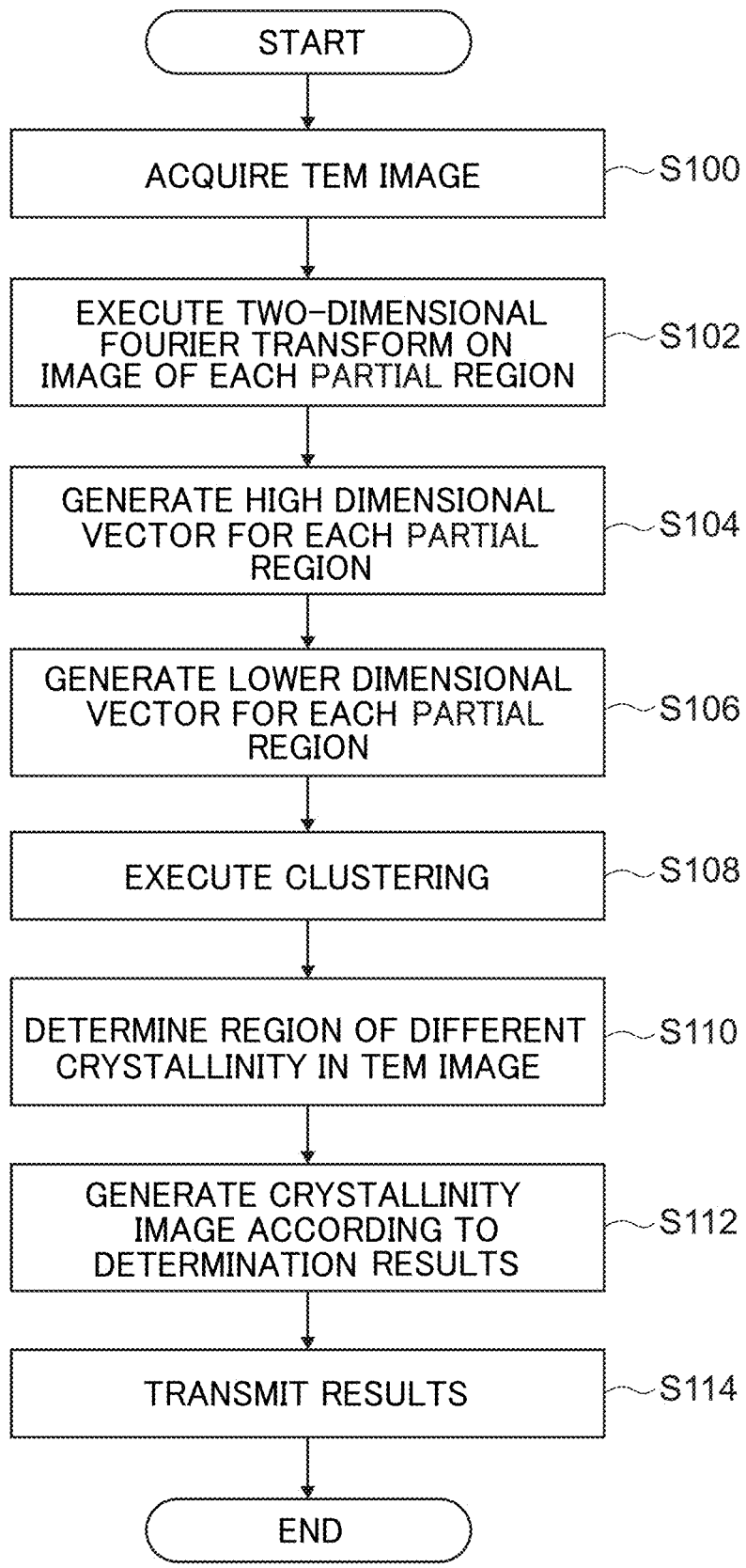
FIG. 7 is a flowchart illustrating an example of information processing performed by a server according to an exemplary embodiment.
Figure 8:
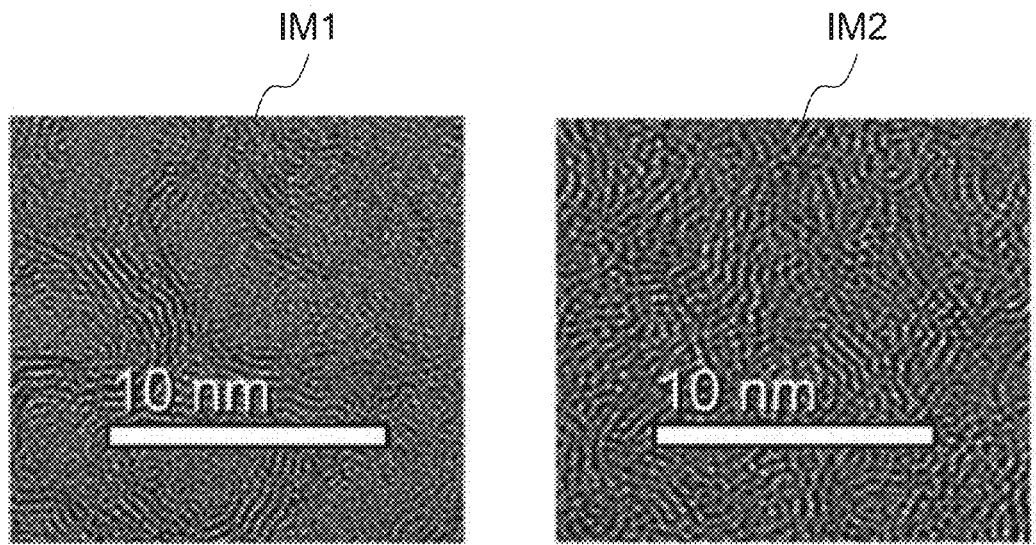
FIG. 8 is a diagram illustrating examples of TEM images.
Figure 9:
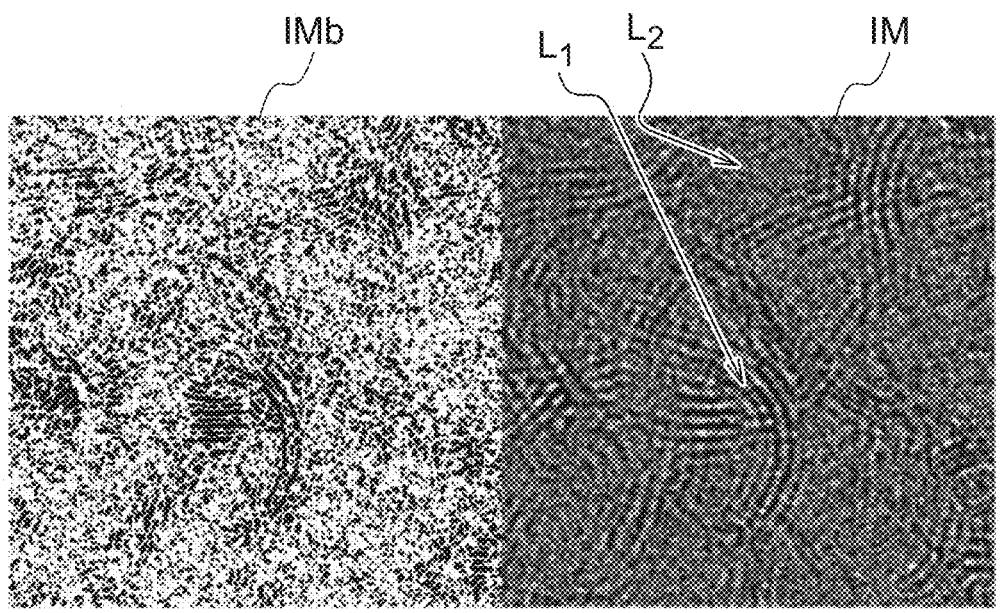
FIG. 9 is a diagram illustrating an example of an image obtained by performing thresholding on a TEM image.

On input of a TEM image to the user terminal 12, the user terminal 12 transmits the TEM image to the server 14. On receipt of the TEM image by the server 14, the server 14 executes the information processing routine illustrated in FIG. 7

At step S100, the CPU 51 functions as the acquisition section 142 to acquire the TEM image received by the transmission/reception section 140.

At step S102, the CPU 51 functions as the conversion section 144 to set partial regions centered on center pixels in the TEM image acquired at step S100. Plural of the partial regions are set. The CPU 51 also functions as the conversion section 144 to execute a two-dimensional Fourier transform on an image of each of the plural partial regions.

At step S104, based on the results of the two-dimensional Fourier transform on each of the partial regions obtained at step S102, the CPU 51 functions as the clustering section 146 to generate a higher dimensional vector with the frequency strengths obtained from the results of the two-dimensional Fourier transform as components. Specifically, the clustering section 146 integrates the vectors representing the frequency strengths within each of the partial regions in order to obtain a higher dimensional vector expressing integrated values, such as that illustrated by the graph Sp in FIG. 3 described previously. A higher dimensional vector is obtained for each of the partial regions.

At step S106, the CPU 51 functions as the clustering section 146 and employs principal component analysis to compress the higher dimensional vector obtained for each of the partial regions at step S104 into a lower dimensional vector, so as to generate a lower dimensional vector for each of the partial regions.

At step S108, the CPU 51 functions as the clustering section 146 to perform clustering on the lower dimensional vectors obtained for each of the partial regions at step S106.

At step S110, the CPU 51 functions as the determination section 148 to determine regions of different crystallinity in the TEM image based on the clustering results obtained at step S108.

At step S112, the CPU 51 functions as the image generation section 150 to apply the first pixel value (for example a pixel value expressing white) to pixels at positions corresponding to the center pixels in cases in which the center pixels have been determined to be high crystallinity based on the determination results obtained at step S110. The CPU 51 also functions as the image generation section 150 to apply the second pixel value (for example a pixel value expressing black) to pixels at positions corresponding to the center pixels in cases in which the center pixels have been determined to be low crystallinity based on the determination results obtained at step S110. A crystallinity image expressing the degree of crystallinity is generated in this manner.

At step S114, the CPU 51 functions as the transmission/reception section 140 to transmit the crystallinity image generated as a result of step S112 to the user terminal 12 as results.

As described above, the server 14 of the information processing system 10 according to the present exemplary embodiment executes a two-dimensional Fourier transform on an image of a partial region for each of the partial regions in the TEM image, this being an image captured by a transmission electron microscope. The server 14 performs clustering according to the frequency strengths obtained from the results of the two-dimensional Fourier transform, based on the results obtained by executing the two-dimensional Fourier transform on each of the plural partial regions. The server 14 also determines regions of different crystallinity in the TEM image based on the clustering results. This enables simple determination of the crystallinity of a material depicted in the TEM image. More specifically, this enables simple determination of regions of different crystallinity in the material depicted in the TEM image.

Since a trained model such as a neural network is not required, the crystallinity of the respective partial regions in a TEM image can be determined without preparing labeled training data. Moreover, the crystallinity of respective partial regions in a TEM image can be determined without setting threshold values.

Note that although explanation has been given regarding an example in which the processing performed by the respective devices of the exemplary embodiment described above is software processing performed by executing a program, this processing may be performed by hardware. Alternatively, the processing may performed by a combination of software and hardware. The program stored in the ROM may be distributed in a format stored on various storage media.

The present disclosure is not limited to the above explanation, and obviously various other modifications may be implemented within a range not departing from the spirit of the present disclosure.

For example, although in the exemplary embodiment described above, explanation has been given regarding an example of a case in which the plural partial regions in a TEM image are clustered into the first cluster representing regions of high crystallinity and the second cluster representing regions of low crystallinity, there is no limitation thereto. Any number of clusters may be employed for determination of regions of different crystallinity in a TEM image.

Moreover, although in the exemplary embodiment described above, explanation has been given regarding an example of a case in which principal component analysis is employed as a predetermined vector compression method, there is no limitation thereto. Other compression methods may be employed. For example, uniform manifold approximation and projection (UMAP), this being a known compression method, may be employed.

Moreover, although in the exemplary embodiment described above, explanation has been given regarding an example of a case in which a higher dimensional vector is compressed to a two-dimensional vector, there is no limitation thereto. The higher dimensional vector may be compressed into a vector of three or more dimensions. Alternatively, clustering may be performed on higher dimensional vectors in an uncompressed state.

All publications, patent applications, and technical standards mentioned in this specification are herein incorporated by reference to the same extent as if each individual publication, patent application, or technical standard was specifically and individually indicated to be incorporated by reference.

The invention claimed is:

1. An information processing device comprising:
a memory; and
a processor coupled to the memory, the processor being configured to:
acquire an image captured by a transmission electron microscope;
for each partial region in the image, execute a two-dimensional Fourier transform on an image of the partial region;
based on results obtained by executing the two-dimensional Fourier transform on each of the partial regions, perform clustering of frequency strengths obtained from the results of the two-dimensional Fourier transform; and
determine regions of different crystallinity in the image, based on results of the clustering, wherein:
in a case of executing the two-dimensional Fourier transform, the processor is configured to execute the two-dimensional Fourier transform on each of the partial regions, each of the partial regions representing an image within a predetermined range centered on a center pixel; and
in a case of determining the regions of different crystallinity in the image, the processor is further configured to determine whether or not each of the partial regions is a region of high crystallinity by determining whether or not the center pixel of each of the partial regions is a high crystallinity pixel from results of the clustering based on results of the two-dimensional Fourier transform calculated for each of the partial regions.

2. The information processing device of claim 1, wherein, in a case of performing the clustering, the processor is further configured to cluster a plurality of the partial regions into a first cluster representing regions of high crystallinity and a second cluster representing regions of low crystallinity.

3. The information processing device of claim 1, wherein the processor is further configured to generate a crystallinity image expressing degrees of crystallinity by, based on results of determination for each center pixel, applying a first pixel value to a pixel at a position corresponding to the center pixel in a case in which high crystallinity has been determined and applying a second pixel value to a pixel at the position corresponding to the center pixel in a case in which low crystallinity has been determined.

4. The information processing device of claim 1, wherein, in a case of performing the clustering, the processor is further configured to integrate frequency strengths obtained from the results of the two-dimensional Fourier transform and to cluster values obtained by the integration.

5. An information processing device comprising:
a memory; and
a processor coupled to the memory, the processor being configured to:
acquire an image captured by a transmission electron microscope;
for each partial region in the image, execute a two-dimensional Fourier transform on an image of the partial region;
based on results obtained by executing the two-dimensional Fourier transform on each of the partial regions, perform clustering of frequency strengths obtained from the results of the two-dimensional Fourier transform; and
determine regions of different crystallinity in the image, based on results of the clustering, wherein,
in a case of performing the clustering, the processor is further configured to use a predetermined vector compression method to compress higher dimensional vectors, which are values obtained by the integration, into lower dimensional vectors that are vectors with fewer dimensions than the higher dimensional vectors, and to cluster the compressed lower dimensional vectors.

6. An information processing method in which a processor executes processing, the processing comprising:
acquiring an image captured by a transmission electron microscope;
for each partial region in the image, executing a two-dimensional Fourier transform on an image of the partial region;
based on results obtained by executing the two-dimensional Fourier transform on each of the partial regions, performing clustering of frequency strengths obtained from the results of the two-dimensional Fourier transform; and
determining regions of different crystallinity in the image, based on results of the clustering, wherein:
in a case of executing the two-dimensional Fourier transform, the processor is configured to execute the two-dimensional Fourier transform on each of the partial regions, each of the partial regions representing an image within a predetermined range centered on a center pixel; and
in a case of determining the regions of different crystallinity in the image, the processor is further configured to determine whether or not each of the partial regions is a region of high crystallinity by determining whether or not the center pixel of each of the partial regions is a high crystallinity pixel from results of the clustering based on results of the two-dimensional Fourier transform calculated for each of the partial regions.

7. A recording medium recorded with an information processing program executable by a processor to perform processing, the processing comprising:
acquiring an image captured by a transmission electron microscope;
for each partial region in the image, executing a two-dimensional Fourier transform on an image of the partial region;
based on results obtained by executing the two-dimensional Fourier transform on each of the partial regions, performing clustering of frequency strengths obtained from the results of the two-dimensional Fourier transform; and
determining regions of different crystallinity in the image, based on results of the clustering, wherein:
in a case of executing the two-dimensional Fourier transform, the processor is configured to execute the two-dimensional Fourier transform on each of the partial regions, each of the partial regions representing an image within a predetermined range centered on a center pixel; and
in a case of determining the regions of different crystallinity in the image, the processor is further configured to determine whether or not each of the partial regions is a region of high crystallinity by determining whether or not the center pixel of each of the partial regions is a high crystallinity pixel from results of the clustering based on results of the two-dimensional Fourier transform calculated for each of the partial regions.

8. An information processing method in which a processor, coupled to a memory, executes processing, the processing comprising:
acquiring an image captured by a transmission electron microscope;
for each partial region in the image, executing a two-dimensional Fourier transform on an image of the partial region;
based on results obtained by executing the two-dimensional Fourier transform on each of the partial regions, perform clustering of frequency strengths obtained from the results of the two-dimensional Fourier transform; and
determining regions of different crystallinity in the image, based on results of the clustering, wherein,
in a case of performing the clustering, the processor integrates frequency strengths obtained from the results of the two-dimensional Fourier transform and clusters values obtained by the integration; and wherein,
in a case of performing the clustering, the processor uses a predetermined vector compression method to compress higher dimensional vectors, which are values obtained by the integration, into lower dimensional vectors that are vectors with fewer dimensions than the higher dimensional vectors, and clusters the compressed lower dimensional vectors.

9. A recording medium recorded with an information processing program executable by a processor to perform processing, the processing comprising:
acquiring an image captured by a transmission electron microscope;
for each partial region in the image, executing a two-dimensional Fourier transform on an image of the partial region;
based on results obtained by executing the two-dimensional Fourier transform on each of the partial regions, performing clustering of frequency strengths obtained from the results of the two-dimensional Fourier transform; and
determining regions of different crystallinity in the image, based on results of the clustering, wherein,
in a case of performing the clustering, the processor integrates frequency strengths obtained from the results of the two-dimensional Fourier transform and to cluster values obtained by the integration; and wherein,
in a case of performing the clustering, using a predetermined vector compression method to compress higher dimensional vectors, which are values obtained by the integration, into lower dimensional vectors that are vectors with fewer dimensions than the higher dimensional vectors, and clustering the compressed lower dimensional vectors.

* * * * *